Figure 1:
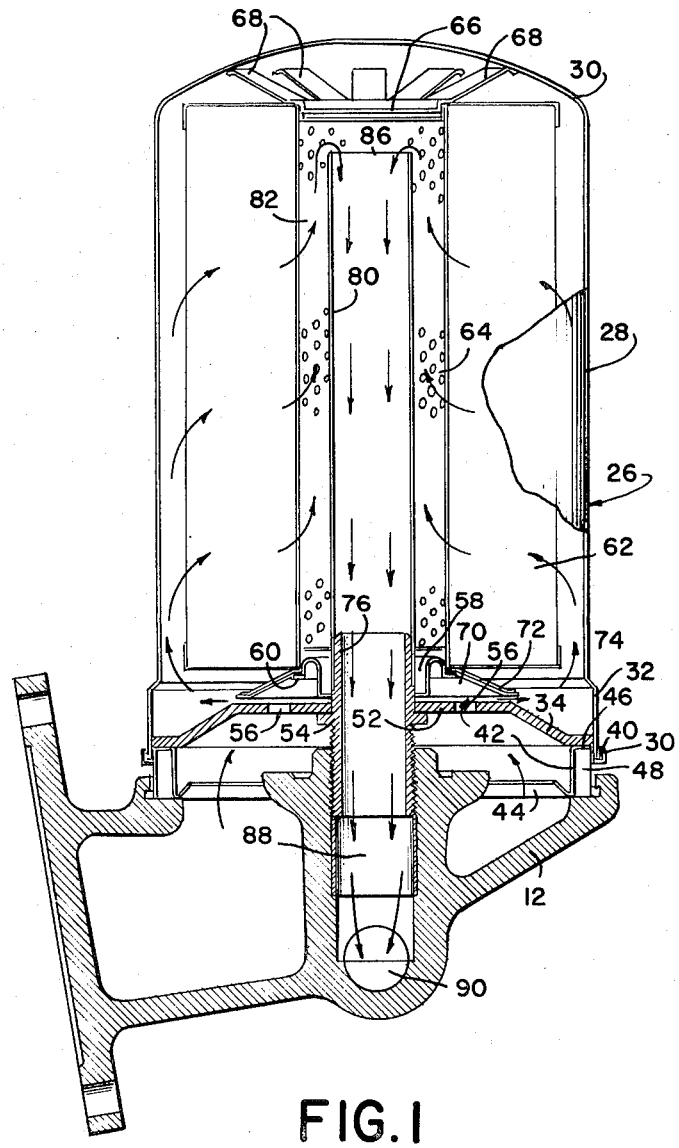

United States Patent [19]

Hall

[11] 3,724,665
[45] Apr. 3, 1973

[54] FILTER UNIT

[75] Inventor: Robert L. Hall, Mount Carmel, Ill.

[73] Assignee: Champion Laboratories, Inc., West Salem, Ill.

[22] Filed: Apr. 1, 1971

[21] Appl. No.: 130,385

[52] U.S. Cl. .................210/130, 210/136, 210/438, 210/440, 210/441
[51] Int. Cl. ....................B01d 27/10, B01d 27/08
[58] Field of Search......210/130, 136, 438, 440, 441, 210/443

[56] References Cited

UNITED STATES PATENTS

| 2,995,249 | 8/1961 | Boewe et al. | 210/130 |
| 3,333,703 | 8/1967 | Scaruzzo | 210/232 |
| 3,259,247 | 7/1966 | Tietz | 210/440 X |
| 1,741,672 | 12/1929 | Arnold | 210/438 |
| 2,886,180 | 5/1959 | Morgan et al. | 210/438 |

Primary Examiner—Frank A. Spear, Jr.
Attorney—Lawrence J. Winter

[57] ABSTRACT

A filter unit comprising a cylindrical casing with a plate member closing off one end thereof and having oil inlet port means and oil discharge means therein and gasket means for seating the filter unit on a pedestal or base mounted on a vehicle engine with threaded means for securing the filter unit to the pedestal or base, and with a standpipe extending centrally of the casing with an annular filter element disposed therearound and with check valve means disposed in the casing adjacent the plate member and a bypass valve disposed within the center tube of the filter element.

3 Claims, 4 Drawing Figures

INVENTOR.
ROBERT L. HALL
BY
Lawrence J. Winter
ATTORNEY

FILTER UNIT

The present invention relates to an oil filter unit of the spin-on throwaway type which can be easily and quickly screwed into its operating position on a base or pedestal protruding from a vehicle engine.

In the lubricating oil system on a large internal combustion engine, one of the prior art oil filter mounting arrangements includes an elongates stud which extends through the top of the oil filter casing and out of the bottom thereof and threads into the filter mounting base or pedestal disposed on the engine block of the vehicle. The bottom of the casing is normally open and the lower edge of the casing is seated on a gasket for sealing disposed on the base. When it is desired to change the oil filter element enclosed in the casing, the stud which is provided with a hexagonal head has a wrench type tool applied to it in order to unthread the stud from the pedestal. Thereafter the filter cartridge is removed and a new cartridge is placed in the casing and the wrench is again used to reassemble the parts.

It is an object of the present invention to replace this type of oil filter casing and stud type assembly with a one-piece compact throwaway type spin-on filter assembly which has no loose component parts, but consists of a single component member.

It is another object of the present invention to provide a throwaway type spin-on oil filter unit which eliminates the several loose component parts found heretofore in the prior art in the stud type oil filter assembly so that the oil filter unit can be installed directly on the existing mounting base used by the case and stud type oil filter assembly and which further can be removed without the use of tools.

It is another object of the present invention to provide a throwaway type spin-on filter assembly which eliminates or minimizes the problems encountered heretofore in servicing the conventional stud and case type oil filter assembly.

It is another object of the present invention to provide a throwaway type spin-on oil filter assembly that has a closed housing or casing with oil inlet means and oil outlet means adjacent one end thereof and with a standpipe extending upwardly into the casing to replace the conventional stud and case type oil filter assembly.

It is another object of the present invention to provide a throwaway type spin-on oil filter assembly that can be used to convert a conventional stud and case type oil filter assembly arrangement to a one-piece spin-on assembly to be utilized with different types of mounting bases by merely changing the configuration of the base plate, i.e., the depth and diameter thereof, the gasket retainer, and other related parts of the assembly to provide a means of attachment and sealing to another particular mounting base.

It is another object of the present invention to provide an oil filter unit of the throwaway spin-on type for large internal combustion engines to replace the conventional stud and case type filter assembly used heretofore, in which the one-piece spin-on oil filter is installed on existing mounting pedestals or bases on a vehicle by hand by merely turning the filter assembly to screw its thread bushing into the mounting base.

It is yet another object of the present invention to provide a spin-on throwaway type oil filter to replace a conventional stud and case type filter assembly which has a compressible rubber sealing gasket member and gasket support band on the outer periphery of the gasket so that the filter assembly is capable of withstanding the high internal oil pressures that can be developed by the engine, which is in excess of 200 PSI.

It is yet another object of the present invention to provide a spin-on type throwaway oil filter assembly for conversion of a conventional stud and case type filter assembly, which is provided with a check valve assembly and standpipe extending upwardly in its center tube to prevent the oil inside the filter shell from draining out of the base plate inlet and outlet holes of the filter assembly during engine shutdown periods to prevent dry starts due to no initial oil pressure because of an empty filter shell that must be filled before oil pressure can be built up in the engine.

It is a further object of the present invention to provide a spin-on type oil filter assembly having a completely enclosed casing with a check valve assembly and standpipe therein for quick and easy removal from the pedestal of an engine, and which further prevents an excessive amount of oil from draining out of the filter inlet and outlet ports and onto the engine block or other engine parts when removed for servicing.

It is still another object of the present invention to provide a spin-on type oil filter assembly having a standpipe and a check valve and a relief valve therein for conversion of a conventional stud and case type filter assembly to a throwaway type and to provide a front end differential relief valve to prevent the engine from being starved of oil should the filter element become clogged for any reason.

Figure 2:
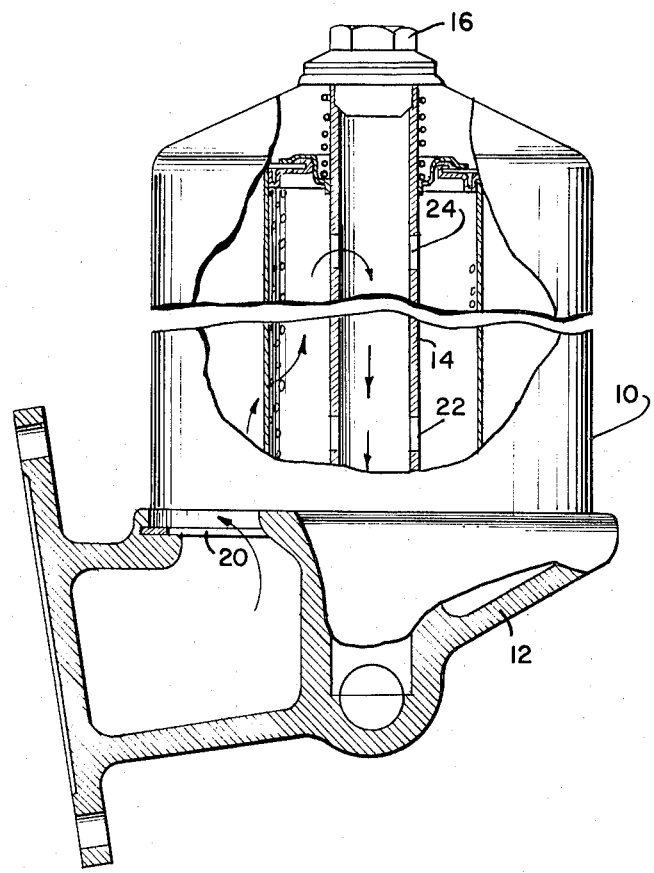
Figure 3:
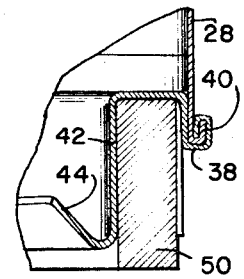
Figure 4:
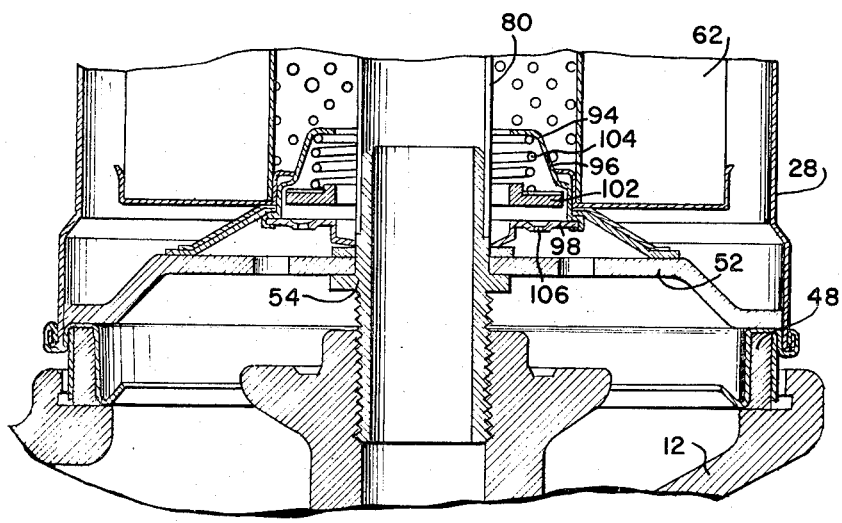

Various other objects and advantages of the present invention will be readily apparent from the following detailed description when considered in connection with the accompanying drawings forming a part thereof and in which FIG. 1 is a side elevational view in section illustrating the oil filter unit embodied in the present invention mounted on a base, FIG. 2 is a more or less schematic drawing of a conventional stud and case type assembly oil filter, FIG. 3 is a detailed fragmentary view illustrating the sealing gasket of the oil filter assembly before it is disposed in an oil tight relationship as shown in FIG. 1, and FIG. 4 is a fragmentary view of the oil filter assembly embodying the present invention when it has a relief valve disposed therein.

Referring to the drawings, and particularly FIG. 2, the reference numeral 10 generally designates a filter housing or cylindrical case mounted on a base or pedestal 12 by a threaded stud 14, having a hexagonal head 16 for applying a wrench thereto. The interior of the case 10 is provided with a conventional annular pleated paper filter element 18, and the bottom end of the case 10 is open as indicated at 20, and the oil flows through the case from the base and back to the base as indicated by the direction of the arrows in the drawing. The stud 14 is provided with oil inlet ports 22 and 24 adjacent its upper end.

It will be noted that in the prior art oil filter just described, which is a conventional stud and case type filter assembly, that the bottom end of the case is open so that when it is desired to replace the filter element therein, a wrench is applied to the head 16 and the stud is unthreaded from the base 12. Thereafter, the case 10 is removed completely from the base and the filter element 18 therein is removed and replaced after which the case 10 is again secured to the base 12 by threading the stud 14 back into the base. It will be noted that this type of filter assembly comprises several loose component parts, and thus they must be disassembled with the wrench type tool in order to service it and then be reassembled. It is further to be noted that this particular type of oil filter assembly means that some of the oil will be spilled over the engine within the vehicle since the bottom end of the casing is open. Furthermore, some of the loose parts can be lost during cleaning prior to reassembly which is required on the case and stud type assembly to avoid contamination of the clean oil.

Referring to FIG. 1, the reference numeral 26 generally designates the throwaway spin-on type filter assembly of the present invention, and is provided with a cylindrical housing or casing 28 that is closed at one end 30, which is dome shaped, and is open at the other end.

The open end of the casing is provided with an outwardly flared rim 32 that extends vertically downwardly. The open end of the casing is closed off by a relatively heavy plate member or reinforcement plate 34 that is held in the inner open end of the casing by an annular retainer ring or member 42. The retainer member 42 is provided with a lip 38 that is bent over a corresponding outwardly turned lip 40 on the rim 32 so as to form a rolled liquid tight seam therewith. The retainer plate 42 may be tack welded or secured by any other suitable means to the outer surface of the reinforcement plate 34. The retainer plate has a vertically downwardly extending inner wall extending substantially below the lip 38 and terminating adjacent its inner circumference by an upwardly flared lip 44 and has a substantially horizontal top 46 disposed between the wall 42 and the seam so as to provide a seat for a sealing gasket 48 therein. The sealing gasket may be made of rubber or any other elastomeric material as desired and is substantially rectangular shaped in cross section with the lower end of the sealing gasket extending substantially below the lower edge of the wall 42, as best seen in FIG. 3, when the oil filter assembly is not disposed in a sealed position on the base or pedestal 12.

The reinforcing plate 34 extends upwardly adjacent its outer circumference in an inclined position and terminates in a substantially horizontal central portion 52 having an opening therein in which is disposed an externally threaded bushing 54 secured to the plate 52 by welding or any other suitable means. The portion 52 of the plate is also provided with a plurality of circumferentially spaced oil inlet ports 56 therearound.

A sleeve member 58 is disposed around the bushing 54 within the casing and has a reverse bend adjacent its upper end terminating in an annular rim 60 for receiving a conventional annular pleated paper filter cartridge or element 62 thereon. The filter element 62 is provided with a perforated center tube 64 and has the conventional end caps sealing off its upper and lower ends as well as the upper end of the center tube 64. The filter element is seated on the rim 60 by a spring member 66 having a plurality of upwardly and outwardly extending radial fingers 68, which bear against the dome shaped member 30.

The casing 28 is also provided with an anti-drainback or check valve 70 seated on the rim 60 and comprising a plurality of resilient finger members 72 disposed over a resilient annular gasket 74. The rubber gasket 74 is maintained in a seated position on the portion 52 of the reinforcement plate by the fingers 72 when oil is not flowing through the filter under pressure.

The upper portion 76 of the bushing 54 has secured thereto in any suitable manner a vertical standpipe 80 which defines an annular oil chamber 82 with the center tube 64 surrounding it.

The standpipe 80 extends upwardly in the center tube a substantial distance of the length of the filter cartridge but is spaced from the spring member 66 adjacent its upper end so as to form an oil inlet 86 for receiving oil from the center tube to discharge it through the bushing 54 into the base 12 of the vehicle.

The base 12 of the vehicle is provided with an annular chamber 88 and an oil outlet 90 therein for passing oil from the engine of the vehicle through the filter cartridge and back into the engine. The base may be suitably connected to the vehicle by bolt members or other similar means as desired.

In operation, when the oil filter assembly of the present invention is used, it is only necessary to unthread by hand a dirty or clogged oil filter and thereafter to take the one-piece filter assembly and install it on the existing mounting base 12 by hand, turning the filter assembly which screws the threaded bushing 54 into the complementary mounting base until the sealing gasket 48 is compressed in an oil tight relationship on the annular seat of the pedestal or base. Thereafter, when the oil is pumped through the casing 28, it will pass through the inlet holes 56 and unseat the check valve 70 and pass in an outside-in direction through the pleated paper filter element 62 and then will pass upwardly in the annular oil chamber or channel 82 and over the top of the standpipe 80 and into it through the inlet 86 after which it will be discharged downwardly through the bushing 54 and back into the engine through the oil outlet 90 in the base 12.

Referring to FIG. 4, this modification of the invention is substantially the same as that already described in connection with FIG. 1, except that the oil filter assembly is provided with a relief or bypass valve 94 formed of a sleeve 96 surrounding the bushing 54 and the lower end of the standpipe 80. An annular plate member 98 has its outer periphery secured to the lower end of the sleeve 96 so as to form a rolled seam therewith and is further provided with a plurality of bypass oil ports 106 therein. An annular valve member or disc 102 is disposed within the sleeve 96 to seat over and close off the ports 106. A biasing spring 104 is enclosed within the sleeve 96 and has its upper end bearing against the sleeve 96 and its lower end bearing against the valve disc 102 so as to normally urge the bypass or relief valve in a seated position to close off the oil bypass ports.

The flow of oil through this embodiment of the invention is substantially the same as that already described in connection with FIG. 1, except that if the filter element 62 is clogged or fails to permit the oil to flow therethrough for any reason, or a pressure differential across the filter element exceeds the design opening pressure of the relief valve 94, the oil pressure will then cause the valve disc 102 to overcome the force in the biasing spring 104 maintaining it seated, and the oil will pass through the oil bypass ports 106 and out the upper end of the sleeve 96 and into the top of the standpipe 80 thus bypassing the filter cartridge and maintaining lubricating oil for the engine at all times.

From the foregoing description it is apparent that the present oil filter assembly provides a spin-on throwaway type oil filter that can replace the conventional stud and case type assembly and which is a one-piece compact throwaway spin-on unit that does not require tools to install or remove it from any existing mounting base now in use.

It is further apparent from the foregoing description that the present invention provides a spin-on type oil filter with a standpipe therein that does not have any loose parts that can be lost during cleaning prior to reassembly, which is required on the case and stud type oil filter assembly to avoid contamination of the clean oil.

The present invention further provides a spin-on type oil filter unit to replace a conventional case and stud type assembly which does not reuse any internal parts of the filter assembly when servicing so that the parts are not subject to failure due to fatigue or damage.

The present invention further provides a spin-on type oil filter that is equipped with an anti-drainback feature including a check valve and standpipe combination and is designed to trap or prevent the oil inside the shell from draining out of the filter casing back into the engine crankcase when the filter is mounted in a vertical position with the base plate end of the filter down. Thus the present invention prevents a dry start as described hereinbefore, and the check valve feature also prevents an excessive amount of oil from draining out of the filter onto the engine when removed for servicing.

The present invention further provides a spin-on type throwaway oil filter that can replace the conventional stud and case type oil filter assembly, and the present invention can be provided with a pressure relief valve designed to permit an adequate flow of oil to the engine bearings in case the filter element fails to permit the flow of oil therethrough, which feature can now be used on mounting bases that were not provided with one.

Inasmuch as various changes may be made in location of the several parts, it is not meant to limit the invention except by the scope of the following claims.

What is claimed is:

1. A spin-on throwaway oil filter for mounting on a base extending from a vehicle engine, comprising a cylindrical casing with a closure member closing off one end and having a central opening with a threaded bushing extending from said opening to thread it onto the base and discharge oil therefrom, oil inlet means in said closure member around said bushing, sleeve means in said casing around said central opening, a filter element disposed in said casing between said oil inlet means and bushing and seated on said sleeve, said filter element having a center tube therein, a standpipe extending upwardly a substantial distance into said center tube and in communication with said bushing to discharge oil thereto, and gasket means extending below said closure member to enable said casing to be secured to the base in an oil tight relationship, said standpipe having a substantially smaller diameter than said center tube to provide an annular flow chamber around the standpipe, said bushing being secured to said closure member adjacent said central opening and the lower end of said standpipe being secured to the upper end of the said bushing which has a portion extending upwardly into said center tube, said sleeve means having an annular resilient gasket and leaf spring member disposed thereon forming a check valve covering said oil inlet means, said gasket means being annular and seated in a retainer plate having a vertical elongated wall adjacent its inner circumference and a horizontal wall outwardly of the vertical wall, said retainer plate having a rolled over lip forming a seam with a compementary rolled over lip on the lower periphery of the casing and said plate lip forming a short vertical wall outwardly of said horizontal wall, said sleeve means being provided with a bypass valve and including a sleeve housing surrounding said standpipe with a horizontal annular member with oil bypass ports therein, an annular valve disc seated over said ports, biasing means enclosed in said housing normally maintaining said disc seated, and an annular oil bypass discharge port in said housing surrounding said standpipe and in communication with said annular flow chamber.

2. The oil filter of claim 1 wherein the upper end of said standpipe forms an oil inlet from said center tube.

3. The oil filter of claim 2 including a base with an annular oil chamber for passing oil into said oil filter, an annular seat therearound for receiving said gasket thereon and a threaded central discharge passage for securing said bushing thereto.

* * * * *